United States Patent Office 2,715,136
Patented Aug. 9, 1955

2,715,136

METHOD OF PREPARING DIALKYL THIONOCHLOROPHOSPHATES

Arthur Dock Fon Toy, Chicago, and Guy A. McDonald, Chicago Heights, Ill., assignors to Victor Chemical Works, a corporation of Illinois No Drawing. Application April 29, 1949,
Serial No. 90,558

10 Claims. (Cl. 260—461)

This invention relates to a method of preparing dialkyl thionochlorophosphates.

We have discovered that dialkyl thionochlorophosphates may be prepared in substantially pure form with large yields by reacting phosphorus pentachloride with a dialkyl thionothiolphosphoric acid or an alkali metal salt thereof and separating the dialkyl thionochlorophosphate from the products of the reaction. Although dialkyl thionochlorophosphates have been produced before, the processes employed heretofore in their production have not been satisfactory because of low yields and the difficulty of purifying the dialkyl thionochlorophosphates by separating undesirable products resulting from side reactions. Many of the prior methods employed starting materials that were themselves difficult to make.

In the present method the dialkyl thionothiolphosphoric acid or salt thereof which is used as a starting material is easily prepared in good yields. These starting materials when reacted with phosphorus pentachloride readily produce dialkyl thionochlorophosphates in excellent yields. The reaction used in this invention may be illustrated by the following equations:

(1)
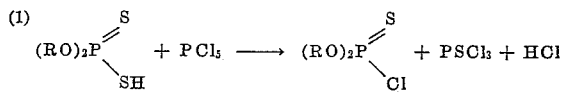

or (2)
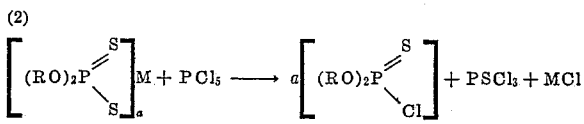

where M is a metal and $a$ is an integer corresponding to the valence of the metal M.

The reaction may be carried out by suspending the phosphorus pentachloride in an inert liquid diluent, such as benzene, ether, PSCl₃, and the like, and slowly adding the dialkyl thionothiolphosphoric acid or salt. Since thiophosphoryl chloride is a by-product of the reaction it is preferred that this material be used as the diluent.

The reaction may also be carried out without employing an added diluent by slowly adding the solid phosphorus pentachloride to the liquid dialkyl thionothiolphosphoric acid, but because of the physical difficulties of handling the solid phosphorus pentachloride this latter procedure is not preferred.

The dialkyl thionothiolphosphoric acid starting material may be easily prepared by known means, for example, by reacting an aliphatic alcohol with phosphorus pentasulfide in accordance with the equation:

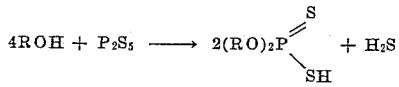

The liberated hydrogen sulfide is removed and the crude reaction product used as the starting material for the present invention, or the crude material may be further purified by distillation or other means, and if desired, converted to a metal salt by neutralization with a suitable base, before utilization in the present process. The crude acid material will generally contain over 80% dialkyl thionothiolphosphoric acid and a small amount of monoalkyl thionothiolphosphoric acid together with small amounts of non-acidic impurities. If desired, the crude acid material may be further purified by known means, such as by distillation, or by neutralizing with a base, separating the resulting salt and regenerating the acid material by treatment with a strong inorganic acid, in a manner similar to that shown in U. S. Patent 1,748,619 (1930). By such means a dialkyl thionothiolphosphoric acid starting material of 95 to 100% purity may be obtained. However, no advantage is gained in the present process by the use of the pure starting materials. Apparently the non-acidic impurities in the crude acid material do not interfere with the reaction for producing the dialkyl thionochlorophosphates. Products of over 99% purity have been obtained in many instances when using the crude acid starting material.

The following examples are given to illustrate the invention:

Example 1

229 grams (10% excess) of phosphorus pentachloride were suspended in 200 cc. of benzene, and 208 grams of the sodium salt of diethyl thionothiolphosphoric acid slowly added while maintaining the reaction temperature between 20° and 25° C. The charge was agitated for one hour after all of the sodium salt had been added, and then filtered to remove the sodium chloride formed by the reaction. The filtered reaction mixture was then heated under reduced pressure to distill off the benzene and by-product thiophosphoryl chloride. The residual liquid was then distilled at a pressure of about 3–5 mm. giving a product having a purity of about 98.5% diethyl thionochlorophosphate, and an index of refraction $N_D^{25}=1.4700$. The yield calculated on the basis of pure diethyl thionochlorophosphate was 75%.

The above example illustrates the use of a metal salt of diethyl thionothiolphosphoric acid as a starting material for the reaction represented by the equation:

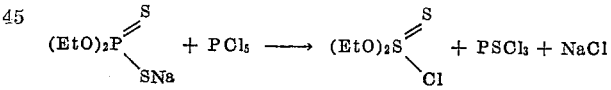

Example 2

104 grams of phosphorus pentachloride (1.5% excess) were suspended in 110 cc. of benzene, and 112 grams of crude diethyl thionothiolphosphoric acid of 79.7% purity slowly added over a period of fifty minutes while maintaining a temperature of 16° to 20° C. The reaction mixture was agitated for forty minutes, and then heated under vacuum to remove the HCl and distill off the benzene and most of the by-product thiophosphoryl chloride. The residual liquid was then fractionated yielding 80 grams of substantially pure diethyl thionochlorophosphate having an index of refraction $N_D^{25}=1.4698$, corresponding to a purity of about 99%. The yield calculated on the basis of the pure product was 87%.

The above example illustrates the use of the diethyl thionothiolphosphoric acid as a starting material.

Example 3

316 grams (1% excess) of phosphorus pentachloride was suspended in 250 cc. of thiophosphoryl chloride, and 279.5 grams 100% diethyl thionothiolphosphoric acid added over a period of approximately two hours while maintaining a temperature of 0° to 5° C. Air was bubbled through the mixture to remove hydrogen chloride.

The thiophosphoryl chloride was then distilled off under vacuum and the residual liquid fractionated. 226.0 grams distilled over a 2 mm. pressure and a vapor temperature of 47° to 54° C. This fraction had a purity of 99% diethyl thionochlorophosphate. A second fraction at 2 mm. pressure and 54° to 65° C. vapor temperature weighed 14.1 grams and had a purity of 95.3%. The combined yield of pure product in the two fractions was approximately 83.8%.

*Example 4*

212 lbs. PCl₃ and 380 lbs. PSCl₃ (recovered from a previous charge) were placed in a 200 gallon nickel reactor and chlorinated with 111 lbs. of chlorine, thereby forming a finely divided suspension of PCl₅ in PSCl₃. To this mixture, 310 lbs. of diethyl thionothiolphosphoric acid (81.7%

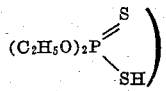

was slowly added over a period of four hours while maintaining a temperature of less than 25° C. The PCl₅ was present in about 15% excess over that theoretically required. The evolved hydrogen chloride was drawn off and the reaction mixture heated under vacuum to distill, first the PSCl₃ and then the diethyl thionochlorophosphate. The first fraction distilling over at 9 mm. pressure and a vapor temperature of about 43° C. weighed 500 lbs. and was substantially pure PSCl₃. A second fraction at 3–4 mm. pressure and a vapor temperature of about 56° C. weighed 141 lbs. and represented a mixture containing approximately 73 lbs. of PSCl₃ and 68 lbs. of the diethyl thionochlorophosphate. The contents of this fraction may be substantially recovered by use of the fraction as a diluent for succeeding batches. A third fraction weighing 192 lbs. had an index of refraction $N_D^{25}$ of 1.4710. It represents a yield of 74.7% of a fairly pure diethyl thionochlorophosphate product.

The yield of PSCl₃ including the possible recovery of PSCl₃ from the second fraction in succeeding batches was approximately 81.5%.

*Example 5*

112 grams of crude diethyl thionothiolphosphoric acid (79.7%

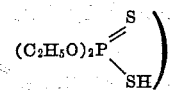

were added to 104 grams of phosphorus pentachloride (1.5% excess) suspended in 100 cc. of thiophosphoryl chloride over a period of 2½ hours at a temperature of 20° to 23° C. The charge was stirred for several hours, the HCl drawn off, then the PSCl₃ was distilled off under vacuum (about 2 mm. pressure), 190 grams of crude PSCl₃ was recovered. The residual liquid was then heated to a maximum of about 110° C. and the diethyl thionochlorophosphate fraction distilled off at a vapor temperature of 47° to 55° C. 83 grams of the substantially pure product were obtained representing a yield of about 90.0%. A residue of 30 grams remaining in the still was discarded.

*Example 6*

273 g. of crude di-n-butylthionothiolphosphoric acid (88.6%

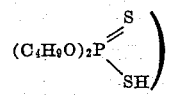

were added to 229 g. of phosphorus pentachloride suspended in 250 cc. of thiophosphoryl chloride (9.7% excess) over a period of two hours at a temperature of 20° to 25° C. The charge was stirred for twenty-five minutes and dry air bubbled in under reduced pressure for 3½ hours. The charge was fractionated removing the PSCl₃ and then the product distilled at a vapor temperature of 84° to 98° C. at 2 mm. pressure. 225 g. of product were obtained representing a 91.9% yield. The product analyzed 12.4% P, 13.2% S, 14.5% Cl, compared to the calculated values of 12.66% P, 13.10% S, 14.49% Cl. The redistilled di-n-butyl thionochlorophosphate had a boiling point of 80° to 83° C. at 1.5 mm. pressure, and an index of refraction $N_D^{25}$ of 1.4673–1.4675.

*Example 7*

248 g. of crude di-n-propylthionothiolphosphoric acid (84.6%

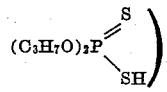

were added to 229 g. phosphorus pentachloride (12% excess) suspended in 250 cc. thiophosphoryl chloride over a period of 1½ hours. The charge was stirred for 25 minutes and dry air bubbled in under reduced pressure for 2¼ hours. The charge was fractionated removing the PSCl₃ and then the product distilled at a vapor temperature of 64° to 80° C. at 1–2 mm. pressure. 188 grams of di-n-propyl thionochlorophosphate having an index of refraction $N_D^{25}$ of 1.4670–1.4678 were obtained representing a yield of 88.6%. The redistilled product had a boiling point of 54 to 55° C. at 1.5 mm. pressure, and an index of refraction $N_D^{25}$ of 1.4671. It analyzed 14.5% P, 15.0% S, and 16.8% Cl compared to theoretical values of 14.3% P, 14.8% S and 16.37% Cl.

Other dialkyl thionochlorophosphates have been made in the same manner as in the above examples. Those containing alkyl groups of less than 5 carbon atoms may be further purified by distillation. Those containing more than 4 carbon atoms in the alkyl groups require other means of purification, such as by solvent extraction, if a pure compound is desired. However, for most purposes the crude products are satisfactory, for example, as intermediates for the production of oil additives, plasticizers, and the like.

The use of less than stoichiometric amounts of PCl₅ will result in proportionately lower yields; however, the use of larger than theoretical amounts will not greatly increase the yields and will thus be wasteful. Generally it is preferred to use about 1–10% excess of PCl₅.

In order to show that the reaction may be carried out without the addition of a diluent the reactants were mixed in the reverse order, the solid phosphorus pentachloride being added to the liquid diethyl thionothiolphophoric acid, for example a 10% excess of PCl₅ was added to a crude diethyl thionothiolphosphoric acid at a temperature of 0° to 10° C. After agitating the mixture for a short period the HCl was drawn off and the PSCl₃ distilled off under vacuum. The residual liquid was then fractionated giving a substantially pure diethyl thionochlorophosphate with a yield of about 95%.

Another possible variation in the procedure may be effected by mixing an inert liquid diluent, such as PSCl₃, and PCl₃ and treating the mixture with chlorine gas in sufficient amount to convert the mixture to a suspension of PCl₅ in PSCl₃ and then adding either diethyl thionothiolphosphoric acid or an alkali metal salt thereof and proceeding as in the above examples. This procedure offers the advantage of facilitating the dispersion of the PCl₅ in a more finely divided state, and eliminates some of the difficulties of manufacturing and handling solid PCl₅ for use in the process.

Dialkyl thionochlorophosphates are valuable intermediates for use in preparing a number of important commercial organic compounds containing phosphorus and sulfur. For example, they may be used in the preparation of commercial insecticides, such as tetra-alkyl dithionopyrophosphate, "Parathion" (diethyl, para nitrophenyl thionophosphate), and the like. The chlorophosphates may also be used in the preparation of neutral ester compounds having plasticizing, or oil additive properties.

Having described our invention in considerable detail as related to the many embodiments of the same, it is our intention that the invention be not limited by any of the details of description unless otherwise specified but rather be construed broadly within its spirit and scope as set out in the accompanying claims.

We claim:

1. The method of simultaneously preparing a dialkyl thionochlorophosphate and thiophosphoryl chloride which comprises reacting phophorus pentachloride with a member of the class consisting of dialkyl thionothiolphosphoric acid and the alkali metal salts thereof in a volatile inert liquid diluent, removing the resulting member of the class consisting of metal chloride and hydrogen chloride, and distilling off and recovering said diluent and the thiophosphoryl chloride product from the residual dialkyl thionochlorophosphate.

2. The method of claim 1 wherein each alkyl group contains from 1 to 4 carbon atoms and the dialkyl thionochlorophosphate is purified by distillation under vacuum.

3. The method of claim 1 wherein said dialkyl group is diethyl.

4. The method of claim 1 wherein said dialkyl group is di-n-propyl.

5. The method of claim 1 wherein said dialkyl group is di-n-butyl.

6. The method of claim 1 wherein the reaction is carried out in thiophosphoryl chloride as a diluent.

7. The method of preparing a dialkyl thionochlorophosphate which comprises suspending phosphorus pentachloride in liquid thiophosphoryl chloride diluent and adding thereto a substantially stoichiometric proportion of dialkyl thionothiolphosphoric acid, maintaining the temperature at less than 30° C. for a period sufficient to liberate the hydrogen chloride product, separating the diluent and thiophosphoryl chloride product from the reaction products, and purifying the dialkyl thionochlorophosphate.

8. The method of claim 7 wherein each alkyl group contains from 1 to 4 carbon atoms and the dialkyl thionochlorophosphate is purified by vacuum distillation.

9. The method of preparing a dialkyl thionochlorophosphate which comprises mixing an inert liquid diluent and phosphorus trichloride, treating said mixture with chlorine gas to convert the mixture to a finely-divided suspension of phosphorus pentachloride in said diluent, adding a member of the class consisting of dialkyl thionothiolphosphoric acid and the alkali metal salts thereof to said suspension to react with the phosphorus pentachloride, removing the resulting chloride, and separating said dialkyl thionochlorophosphate from the products of reaction.

10. The method of claim 9 wherein said diluent is thiophosphoryl chloride.

References Cited in the file of this patent

UNITED STATES PATENTS

| | | |
|---|---|---|
| 2,343,831 | Osborne | Mar. 7, 1944 |
| 2,471,115 | Mikeska | May 24, 1949 |
| 2,482,063 | Hechenbleikner | Sept. 13, 1949 |
| 2,599,341 | McDermott | June 3, 1952 |

OTHER REFERENCES

Carius: Ann. der Chem., vol. 119, pp. 289–302 (1861).

Kovalevsky: Ann. der Chem., vol. 119, pp. 303–313 (1861).

Barbaglia: Ber. Deut. Chem., vol. 5, pp. 875–878 (1872).

Kekule: Ber. Deut. Chem., vol. 6, pp. 943–945 (1873).

Groggins: Unit Processes in Organic Synthesis (1938), p. 197.

Kosolapoff: Organophosphorus Compounds, p. 217 (1950).